3,658,817
4,4'-BIS(2-PHENYL-5-PYRIMIDINOL)

Charles M. Orlando, Schenectady, N.Y., assignor to General Electric Company
No Drawing. Filed Jan. 7, 1970, Ser. No. 1,317
Int. Cl. C07d 51/38
U.S. Cl. 260—256.4 C                               1 Claim

ABSTRACT OF THE DISCLOSURE

Oxidation of 2-phenyl-5-pyrimidinol, also called 2-phenyl-5-hydroxypyrimidine, with lead dioxide or silver oxide in a benzene solution causes oxidative coupling through the 4-position to produce a dimer as a crystalline solid which under ultraviolet irradiation fluoresces with a very bright yellow color either as a solid or in solution. This compound because of its solubility in ordinary solvents can be incorporated in lacquers or polymeric compositions to impart its fluorescent properties to the composition.

---

This invention relates to the new chemical compound 4,4'-bis(2-phenyl-5-pyrimidinol), also known as 4,4'-bis-(2-phenyl-5-hydroxypyrimidine), which is a phosphor having a very bright yellow fluorescence when irradiated with ultraviolet light, especially ultraviolet light having a wavelength in the region of 2500–3900 A. The emission spectrum shows a maximum at a wavelength of 5500 A.

The chemical compound of this invention has the formula

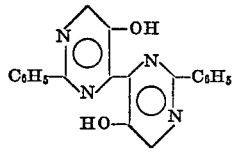

It is prepared by oxidatively coupling 2-phenyl-5-pyrimidinol which has the formula

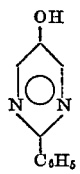

The oxidative coupling reaction is accomplished by refluxing a benzene solution of the 2-phenyl-5-pyrimidinol in the presence of lead dioxide or silver oxide using one mole of the metal oxide for each mole of the pyrimidine. Although not necessary for dimer formation, the presence of an aqueous phase containing a buffer for pH 6.4 improves the yield.

Although there are some known organic compounds which have fluorescent properties, generally the visible light which they emit is so weak that they cannot be incorporated in minor amounts into other compositions to impart fluorescent properties thereto. Only a relatively few organic compounds have strongly fluorescent properties so that they can be used in such applications. However, these materials generally either are not oxidatively or are not thermally stable so that upon long term exposure to air, especially at elevated temperatures, or under continued exposure to ultraviolet light, they lose their fluorescent properties.

For most applications, requiring long term stability of the fluorescent properties, inorganic phosphors have been used. Unlike organic materials, which depend upon their chemical structure for fluorescent properties, inorganic materials depend upon a particular crystal structure for the fluorescent properties. This means that they cannot be used in solution and also when incorporated as a solid into other compositions, care must be taken not to destroy the crystal structure responsible for the fluorescent property. For example, when incorporating such inorganic phosphors as a pigment in a paint or other coating composition, great care must be taken not to shear or grind the pigment, thereby destroying its crystal structure during the operations necessary to disperse the pigment in the paint or coating composition. As a product, or dispersed pigment, one particle overlaying another particle will shield the latter from the exciting light. This means that there is a practical limitation, both on the concentration of the dispersed pigment in the coating composition as well as on the thickness of the coating composition which is deposited on an object if it is desired to excite from one side of a layer, for example, a self supporting film or a coating on a transparent substrate and have the light emitted from the fluorescent pigment visible on the other side.

The 4,4'-bis(2-phenyl-5-pyrimidinol) of this invention is strongly fluorescent when irradiated with ultraviolet light. It is readily soluble in common organic solvents and even very dilute solutions (1% by weight or less) are strongly fluorescent. The intensity of fluorescence is apparently invariant with the exciting wavelength from about 1800 to 4000 A., but thereafter decreases, approaching zero at approximately the wavelength at which it emits, i.e., 5500 A. This compound is oxidatively and thermally stable and melts without decomposition. Therefore, it can be readily incorporated into a polymeric matrix, preferably one which is essentially colorless, by either solution or melt-processing techniques. Only a very small amount, 1% by weight or less, is required to impart the strongly fluorescent color properties to the object fabricated from the polymeric composition.

In order that those skilled in the art may readily understand my invention, the following example is given by way of illustration and not by way of limitation.

The starting material, 2-phenyl-5-pyrimidinol was prepared by the method described by J. H. Chesterfield, J. F. W. McOmie and M. S. Tute in J. Chem. Soc., 4590 (1960). A suspension of 1 g. of this material and 1.38 g. of lead dioxide in a 2 phase mixture of 20 ml. of benzene and 10 ml. of an aqueous phosphate buffer solution (pH 6.4) was refluxed for 90 hours. After filtration and separation of the aqueous phase, the organic layer was evaporated to an oil. Chromatographic separation of this residue on 60 g. of silica gel, eluting with benzene, gave 0.034 g. of 4,4'-bis(2-phenyl-5-pyrimidinol) having a melting point of 294–295° C. identified by its IR and mass spectra ($m/e$=342, M+). Under excitation by ultraviolet light, it showed a very bright yellow fluorescence. The calculated analysis for this material was (percent): C, 70.16; H, 4.12; N, 16.36. Found (percent): C, 70.10; H, 4.07; N, 16.50. The emission spectrum shows a maximum at a wavelength of 5500 A.

Obviously other modifications and variations of the present invention are possible in light of the above teachings. For example, this fluorescent material can be used in conjunction with the fluorescent materials described in the copending application of J. G. Wirth, Ser. No. 1,318, filed concurrently herewith and assigned to the same assignee as the present invention. Use of the compound of this invention in conjunction with the compounds of Wirth which emit different colors than the compound of the present invention permits the obtaining of fluorescent colors intermediate between the compounds used, with the particular color being dependent on their proportions. By this means, a range of different colors can be obtained. Solutions of either the pure compound of this invention or mixed with those of Wirth in a coating composition containing a film forming polymer can be used to coat the envelope of a light producing ultraviolet radiation to produce light bulbs having the fluorescent colors when the light is energized. These and other variations will be readily apparent to those skilled in the art.

What I desire to secure by Letters Patent of the United States is:

1. 4,4'-bis(2-phenyl-5-pyrimidinol).

References Cited

Stachel: C. A. 58, 5692-3 (1963).

ALEX MAZEL, Primary Examiner

R. V. RUSH, Assistant Examiner

U.S. Cl. X.R.

252—301.2 R; 260—37 R, 251 R